(12) United States Patent
Nauen

(10) Patent No.: US 12,013,490 B2
(45) Date of Patent: Jun. 18, 2024

(54) DISTANCE MEASUREMENT UNIT

(71) Applicant: OSRAM Beteiligungsverwaltung GmbH, Grünwald (DE)

(72) Inventor: Andre Nauen, Regensburg (DE)

(73) Assignee: OSRAM Beteiligungsverwaltung GmbH, Grünwald (DE)

(*) Notice: Subject to any disclaimer, the term of this patent is extended or adjusted under 35 U.S.C. 154(b) by 1078 days.

(21) Appl. No.: 16/762,250

(22) PCT Filed: Oct. 31, 2018

(86) PCT No.: PCT/EP2018/079804
§ 371 (c)(1),
(2) Date: May 7, 2020

(87) PCT Pub. No.: WO2019/096585
PCT Pub. Date: May 23, 2019

(65) Prior Publication Data
US 2020/0355804 A1 Nov. 12, 2020

(30) Foreign Application Priority Data

Nov. 15, 2017 (DE) ...................... 10 2017 220 395.1

(51) Int. Cl.
*G01S 7/481* (2006.01)
*G01S 17/10* (2020.01)
*G01S 17/931* (2020.01)

(52) U.S. Cl.
CPC .......... *G01S 7/4817* (2013.01); *G01S 7/4815* (2013.01); *G01S 17/10* (2013.01); *G01S 17/931* (2020.01)

(58) Field of Classification Search
CPC .............................. G01S 7/4817; G01S 7/4815
See application file for complete search history.

(56) References Cited

U.S. PATENT DOCUMENTS

| 9,086,273 B1* | 7/2015 | Gruver | .................... G01S 17/42 |
| 2017/0261371 A1 | 9/2017 | Mheen et al. | |
| 2018/0149751 A1* | 5/2018 | Geiger | .................... G01S 17/36 |

FOREIGN PATENT DOCUMENTS

| DE | 4433082 A1 | 4/1995 |
| DE | 102008019615 A1 | 11/2009 |
| DE | 102009049809 A1 | 6/2011 |

OTHER PUBLICATIONS

Hirsch, Stefanie, International Search Report and Written Opinion of the International Searching Authority, for counterpart application PCT/EP2018/079804, Feb. 11, 2019, European Patent Office, Rijswijk, The Netherlands, 14 pages.

(Continued)

*Primary Examiner* — Jerry T Jean Baptiste
(74) *Attorney, Agent, or Firm* — Slater Matsil, LLP

(57) ABSTRACT

Various implementations disclosed herein include a distance measuring unit for signal transition time-based measurement of a distance to an object located in a detection field, with an emitter unit with multiple emitters, each designed to emit pulses in the form of electromagnetic radiation, a receiver unit for receiving the electromagnetic radiation after a distance-dependent transition time, and a tiltable mirror, wherein the distance measuring unit is configured such that a first of the emitters emits multiple pulses sequentially via the mirror, including at a first time in a first solid angle segment in a first angular position of the mirror, and at a second time in a second solid angle segment in a second angular position of the mirror; and a second of the emitters also emits a pulse in at least one of the solid angle segments via the mirror.

14 Claims, 3 Drawing Sheets

(56) References Cited

OTHER PUBLICATIONS

Schneider, Helmut, German Search Report, for counterpart application DE 10 2017 220 395.1, Aug. 3, 2018, 13 pages.

* cited by examiner

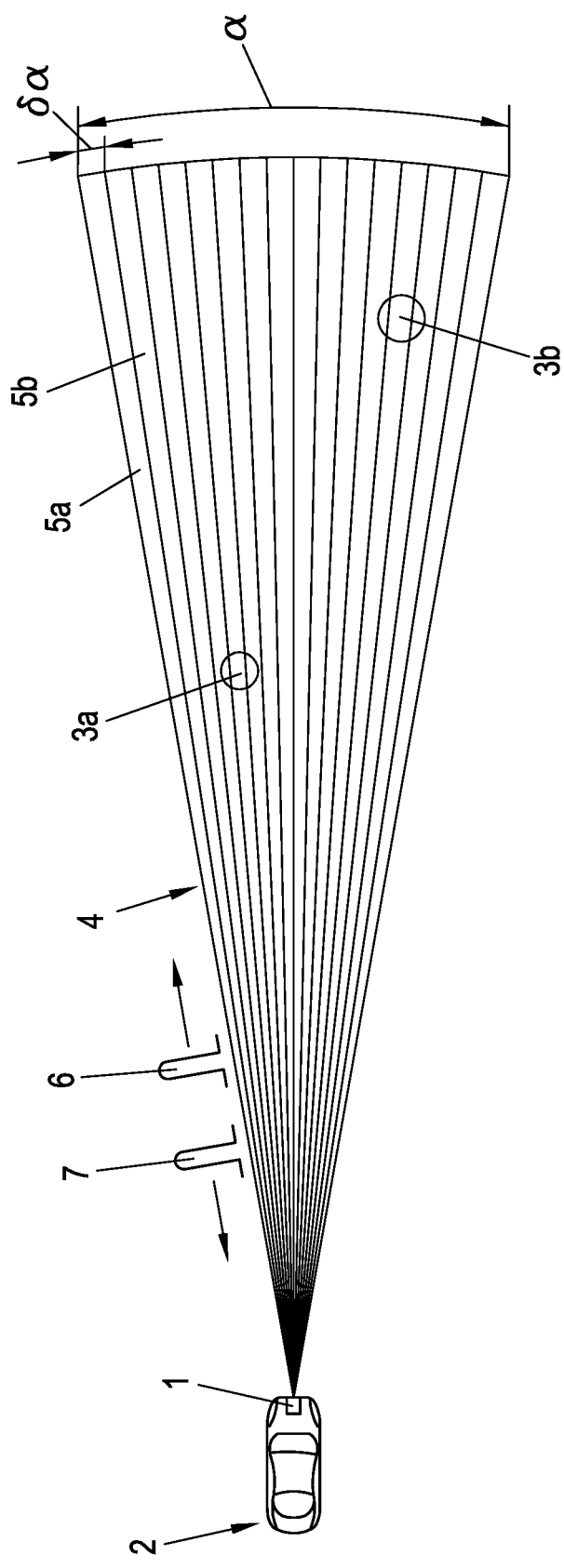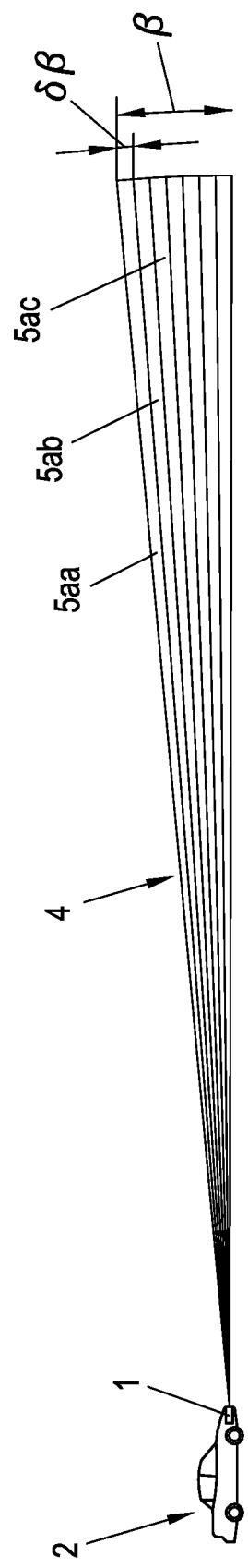
Fig. 1a
Fig. 1b

DISTANCE MEASUREMENT UNIT

CROSS-REFERENCE TO RELATED APPLICATIONS

The present application is a National Stage application of, and claims priority, and the benefit of International Application No. PCT/EP2018/079804, filed Oct. 31, 2018, entitled "DISTANCE MEASUREMENT UNIT", which claims priority, and the benefit of German Application No. 10 2017 220 395.1, filed Nov. 15, 2017, entitled "DISTANCE MEASUREMENT UNIT", the entire contents of which are hereby incorporated by reference.

TECHNICAL AREA

The present invention relates to a distance measuring unit for signal transition time-based distance measurement.

PRIOR ART

The distance measurement in question is based on a transition time measurement of emitted electromagnetic pulses. If these are incident on an object, the pulse is proportionally reflected at its surface back to the distance measuring unit and can be recorded as an echo pulse with a suitable sensor. If the pulse is sent out at a time $t_0$ and the echo pulse is detected at a later time $t_1$, the distance d to the reflective surface of the object can be determined from the transition time $\Delta t_A = t_1 - t_0$ according to $$d = \Delta t_A c/2 \qquad \text{Eq. 1.}$$

Since this is an electromagnetic pulse, c is the value of the speed of light.

Representation of the Invention

The present invention is based on the technical problem of specifying a particularly advantageous distance measuring unit.

This is solved according to the invention with a distance measuring unit as claimed in claim 1. The subject is a distance measuring unit, which in addition to the emitter and receiver unit has a tiltable mirror, by means of which pulses emitted by the emitter unit are reflected in different mirror angular positions in different solid angle segments. The tilting mirror can, for example, swing back and forth, for example resonantly or non-resonantly (see below), which results in different angular positions of the mirror relative to the emitter unit. Specifically, a pulse emitted by a first emitter at a first time in a first mirror angular position is fed into a first solid angle segment, and a pulse emitted at a second time in a second mirror angular position is fed into a second solid angle segment. The sequential emission of the first emitter in different mirror angular positions thus determines the solid angle segments. The emitter unit also has a second emitter, which also emits a pulse via the mirror in at least one of the solid angle segments.

With the distance measuring unit according to the invention, the detection field is thus segmented first by the pulses being reflected in the different mirror angular positions in different spatial directions. This results in a certain resolution or pixelation, wherein each solid angle segment can be considered as a "pixel". According to the invention, more than one emitter are now assigned to one or some or all pixels. In any case, in the course of time (it is preferably sequential pulsing, see below) not only one emitter emits in a given solid angle segment, but at least one other emitter. Accordingly, echo pulses are received in or from the solid angle segment in question, which are caused by different emitters, which can help to improve the signal/noise ratio (SNR), also called the "interference distance". For this purpose, for example, successively received echo pulses can be combined in the course of signal averaging.

Preferred embodiments are found in the dependent claims and the entire disclosure, wherein the representation of the features does not always differentiate in detail between the distance measuring unit and corresponding operating methods or uses; in any case implicitly the disclosure is to be read with respect to all claim categories.

In general, the tiltably mounted mirror allows scanning of the detection field, which is now described first in a simple implementation for orientation and illustration. It is assumed that the pulses are emitted sequentially with a certain pause duration in between. After the first emitter has emitted a first pulse in the first solid angle segment and before it emits a second immediately following pulse in the second solid angle segment, there is a pause duration in which the receiver unit "listens" so to speak. An integrally measuring receiver unit can also be provided, for example, which by itself thus measures the incident radiation without spatial resolution, for example a simple photodiode. This is not mandatory, however, the receiver unit can also be solid angle-resolving (see below in detail), for example in a direction perpendicular to the grid direction.

The detection field, also known as the "field of view" (FoV), is divided in the solid angle segments by the combination of different mirror angular positions and clocked pulses. Together, the solid angle segments fill the field of view, in any case they are largely separate from each other; the most closely adjacent solid angle segments may have an overlap, preferably all solid angle segments are separate from each other. In the case of preferred automotive applications, the detection field can extend horizontally over a greater angular range than vertically, for example, (for example over 60° to 120° horizontally, by contrast over about 30° vertically, for example). Preferably, the horizontal opening angle is segmented with the mirror movement, i.e. the angular positions.

In the different angular positions, the mirror is oriented differently relative to the emitter unit, and thus a surface normal to the mirror surface (the area thereof on which the pulses are incident) has different orientations relative to the emitter unit (in particular to the "beams" along which the pulses fall on the mirror, see below in detail). In this case, the change of inclination of the mirror can generally also be superimposed on another motion component, so the tilting can be carried out by pivoting, for example. In other words, a tilt axis around which the mirror is tilted generally does not have to be stationary relative to the emitter unit or does not have to be in the mirror itself. However, a tilt axis passing through the mirror is preferred, which is static relative to the emitter unit. Preferably, the mirror is mounted to be tiltable around exactly one axis, which is then particularly vertical (relative to the orientation of the mounted distance measuring unit). The mirror can be, for example, a MEMS mirror (Micro Electro Mechanical System, MEMS), which can be advantageous in terms of positioning times and size.

With a MEMS mirror in the case of preferred automotive applications, a preferred scanning frequency may be at least 60 Hz and (regardless of this) no more than 250 Hz. The MEMS mirror may vibrate resonantly or non-resonantly. At a frequency of the emitter pulses of 10 kHz, which results in a pause duration of 100 μs, 20 pulses can then be accommodated in half a MEMS oscillation for example (especially of the first emitter/a single laser source), thus 20 solid angle segments are spanned (at 250 Hz the period duration is 4 ms, the half oscillation is then about 2 ms). This is an estimate, in practice the MEMS mirror will usually overshoot, or the angular velocity will not be constant. For comparison, at a pulse rate of 100 kHz (which corresponds to 10 μs) there are already 200 segments. In contrast to this, at a MEMS frequency of 2 kHz, which corresponds to 500 μs (or 250 μs as half thereof), then at a pulse rate of 10 kHz (100 μs) only about 2 to 3 solid angle segments can be spanned. At 100 KHz, on the other hand, there would be about 25 solid angle segments. This is for illustration, as mentioned.

In general, with a vibrating MEMS mirror, the outward and return movement, i.e. the two half oscillations per period, can also be used differently. Preferably, however, the same solid angle segments are spanned or supplied with pulses in the outward and return movement. In successive periods, for example, a higher resolution image can also be assembled by moving the timing of the pulses in a subsequent period compared to a previous period. The overall picture will then be constructed with a so-called interlace method from time-sequentially recorded sub-images of lower resolution (simply given by the ratio of pulse frequency and mirror frequency). On the other hand, the timing and thus the segmentation can of course also be kept constant during operation.

Each of the emitters is designed for pulsed emission of electromagnetic radiation. Radiation is preferred in the infrared range, i.e. wavelengths of for example at least 600 nm, 650 nm, 700 nm, 750 nm, 800 nm or 850 nm (increasingly preferred in the order in which they are named). Around 905 nm may be particularly preferred, for example, wherein advantageous upper limits can be at no more than 1100 nm, 1050 nm, 1000 nm or 950 nm (increasingly preferred in the order in which they are named). Another preferred value can be for example at around 1064 nm, which results in advantageous lower limits of at least 850 nm, 900 nm, 950 nm or 1000 nm and (independently thereof) in advantageous upper limits of not more than 1600 nm, 1500 nm, 1400 nm, 1300 nm, 1200 nm or 1150 nm (increasingly preferred in the order in which they are named). Preferred values can also be around 1548 nm or 1550 nm, which results in advantageous lower limits of at least 1350 nm, 1400 nm, 1450 nm or 1500 nm and (independently thereof) advantageous upper limits of not more than 2000 nm, 1900 nm, 1800 nm, 1700 nm, 1650 nm or 1600 nm (increasingly preferred in the order in which they are named in each case). In general, however, wavelengths in the far IR are conceivable, for example at 5600 nm or 8100 nm.

The emitters provided in a multiple may, for example, also differ in their wavelengths, i.e. the wavelength of the respective emitted radiation, at least in groups. If then the receiver unit is also correspondingly wavelength sensitive, for example with multiple sensors each only sensitive in the wavelength range of one emitter or a corresponding emitter group (for example by filtering a photodiode), the pulses can also be differentiated according to their wavelength and thus, for example, more closely timed or even emitted simultaneously.

Insofar as a particular operation is described, this means, in relation to the distance measuring unit itself, that its control unit is set up accordingly. Although in general an analog conversion seems conceivable, the control unit will usually have a suitably programmed digital unit. This can then control drivers to operate the radiation sources. The control unit may optionally also be further integrated, i.e. may also include an evaluation unit, which evaluates the echo pulses detected with the sensor unit (but this is not mandatory, the evaluation can also be carried out for example with a separate computer unit, for example the on-board computer in the case of the motor vehicle, or via a cloud connection).

A pulse is a time-limited quantity that is emitted and then, in the event of a reflection at the object, is detected by a sensor of the distance measuring unit with a time offset. A pulse width detected after the full width at half maximum (FWHM) may be, for example, at no more than 1 ms, preferably even significantly smaller, namely at, increasingly preferred in the order in which they are named, not more than 800 μs, 600 μs, 400 μs or 200 μs, or even smaller, namely at no more than 1000 ns, 900 ns, 800 ns, 700 ns, 600 ns, 500 ns, 400 ns, 300 ns, 200 ns, 100 ns, 80 ns, 60 ns, 40 ns, 30 ns, 25 ns, 20 ns, 10 ns, 5 ns or 2 ns (increasingly preferred in the order in which they are named). In principle, a pulse that is as short as possible is preferred, wherein for technical reasons lower limits can be at least 0.001 ns, 0.01 ns or 0.1 ns, for example.

The emitter unit has multiple emitters, i.e. at least two, or even at least 2, 3, 4, 5, 6, 7, 8, 9 or 10 emitters. Possible upper limits may be (independently thereof) for example no more than 10000, 8000, 6000, 5000, 4000, 3000, 2000, 1000, 500 or 100 emitters. The emitters each have their own emission surface for radiation emission. In any case, in terms of their structure they can be operated independently of each other in principle, but in the emitter unit they can, for example, already be interconnected in (predefined) groups.

The emitters are preferably laser sources. If the emitters are already integrated on the chip, for example implemented as a so-called VCSEL array (see below in detail), the emitters can also already be grouped by suitable wiring on the chip (group by group). However, an emitter unit is preferred which has emitters that can be operated entirely independently of each other, wherein a possible combination is achieved in operation by means of corresponding control.

In a preferred embodiment, the first and second emitters emit the pulses, which they emit in the same solid angle segment, sequentially relative to each other. Therefore this does not concern the sequential pulses of the first emitter itself, which spans the solid angle segments, but the timing of the second emitter relative to it. In simple terms, the two emitters should not emit at the same time throughout the operation. For example, the first emitter can emit first and then the second emitter emits into the first solid angle segment, before the first emitter emits in the second solid angle segment and then the second emitter emits in the second solid angle segment, etc. On the other hand, however, the first emitter can also emit sequentially in multiple solid angle segments before the second emitter also emits sequentially in the same solid angle segments.

The aforementioned advantage (improved interference distance) can generally also be achieved with simultaneous pulsing of multiple emitters (laser diodes) in the same solid angle segment, but a sequential approach is preferred. It can be advantageous with sequential pulsing, for example, if the maximum power occurring at the system level corresponds only to the respective maximum power of the single emitter. Furthermore, the time offset between the emissions of the individual emitters may also be advantageous in so far as (purely statistically) the probability decreases that an external interference signal affects the measurement (the probability is lower that such an interference signal is present over a corresponding period of time and affects the successive pulses).

Insofar as the operation of the first and second emitters is described generally in the context of this disclosure, another or further emitters can always preferably be operated in an analogous manner. Thus, at least 3, 4, 5, 6, 7, 8, 9 or 10 emitters can emit in the solid angle segment or segments, in particular sequentially (relative to each other). Possible upper limits can be, for example, no more than 100, 80, 60, 40, 30 or 20 emitters per solid angle segment. Overall, not only the first and/or the second solid angle segments are then supplied by multiple emitters, but also, for example, at least 20%, 40%, 60%, 70%, 80% and 90% of solid angle segments, especially preferably all segments (100%). The number of solid angle segments also depends on the opening angle of the detection field, lower limits can be for example at least 10, 20, 30, 40 or 50, whereas upper limits independent thereof can be for example no more than 2000, 1000, 600, 500, 400 or 300 solid angle segments.

In a preferred embodiment, the pulses of the different emitters that are tilted relative to each other are incident on the mirror. Therefore a first beam, along which the pulses of the first emitter are incident on the mirror, is tilted relative to a second beam, along which the pulses of the second emitter are incident. In general, the emitters themselves may also not be tilted relative to each other, because the tilting can be achieved optically (for example, mutually parallel beams pass through a collecting lens and in doing so are tilted relative to each other).

Preferably, the first and second emitters or the emitters as a whole are tilted relative to each other, so the pulses propagate away from their respective emission surfaces along beams that are tilted relative to each other. The beams that are tilted relative to each other preferably lie in a plane with each other. Depending on the orientation (see below in detail), the beams may, for example, enclose a tilt angle between them, which can result, for example, as a horizontal opening angle of the detection field (for example 120°), divided by the number of solid angle segments (this concerns a tilt in a direction of view parallel to the tilt axis, see below in detail). The "beams" are in general connecting lines from the emitters (their respective connecting lines) to the mirror (the reflective surface thereof), the course of which is determined according to the principles of geometric beam optics (hereinafter referred to as "reflected beams" which then describe the further propagation away from the mirror). If the emitters were not pulsed, but emitted continuously, radiation would be continuously incident along the beams, whereas due to the pulsed operation individual pulses propagate along the beams one after the other.

In a preferred embodiment, the beams are incident on the mirror tilted relative to each other that so that they enclose a (first) angle between them in a direction of view parallel to the tilt axis of the mirror. Preferably, the emitters are already tilted accordingly relative to each other, see also the notes above. The tilting then exists with respect to a plane or direction in which the solid angle segments are also spanned (by the different angular positions and the sequential pulses of the first emitter). In other words, the beams are incident on the mirror in such a way or the emitters are tilted relative to each other in such a way that, assuming the same mirror angular position, the pulses of the different emitters would pass into different solid angle segments. The emitters can nevertheless emit in the same solid angle segment in operation, namely sequentially.

With a preferred embodiment, the (first) angle between the beams of the first and second emitters corresponds to half the tilt angle of the mirror or an integer multiple of the tilt angle (for example 2 times, 3 times or 4 times etc.). The different sources can thus emit their pulses sequentially, in different mirror angular positions, in exactly the same solid angle segment. The tilt angle is the angle by which the mirror is moved between the first and second angular positions. The two angular positions are closely adjacent to each other, so there is no further angular position between them. In other words, solid angle segments that are tilted relative to each other by the tilt angle are next to each other.

In a preferred embodiment, the (first) angle between the beams of the first and second emitters is at least 0.2°, wherein at least 0.22° are further preferred and at least 0.24° are particularly preferred. For example, assuming a mirror oscillation with a frequency of 2 kHz, an angular velocity $v_\alpha$ of $1.2 \times 10^{-4}$°/ns results for an opening angle (grid angle) of 60°. Assuming that the range should be 300 m, which corresponds to a signal path of 600 m, a measuring time of 2 µs results, resulting in the angular difference of 0.24°. Thus, the mirror is moved further by a corresponding angular difference, while the receiver unit is still "listening" to the previously emitted pulse (see above). Only then is the next pulse emitted, which results in the aforementioned grid dimension.

Upper limits of the angular distance between the first and second beams or the first and second emitters can be motivated, for example, by a compact design where possible. Similarly, it may be of interest not to allow the time offset between the pulses emitted sequentially in the same solid angle segment to become too large. Quantitatively, values can for example no more than 20°, 15°, 10°, 5° or 1°, wherein this refers explicitly to the angular distance between the closely adjacent emitters. Therefore, if for example a large number of emitters are provided, the angular distance between emitters, between which further emitters are arranged, can of course also be larger (they are not next to each other).

With a preferred embodiment, the emission of the pulses of the first and second emitters is timed so that after the mirror the pulses propagate on reflected beams, which are spatially coincident (when viewed from the direction of view parallel to the tilt axis). The "reflected beams" describe the radiation propagation after reflection (on the mirror, not on the object) according to the principles of geometric beam optics. These reflected beams are spatially (not temporally) coincident, so the pulses propagate away from the same point of the reflective surface on exactly the same path.

In detail, the time offset between the emission of the first pulse from the first emitter and the emission of the second pulse from the second emitter then depends on the angular velocity $v_\alpha$ of the mirror on the one hand and on the (first) angle between the emitters (and also on the desired range, see above). For example, if the angle is 2.4° (10 times 0.24°), the angular velocity of $1.2 \times 10^{-4}$°/ns discussed above results in a time offset of 2 µs (for a range of 300 m). This is only for illustration, of course other mirror frequencies and thus angular speeds or even grid angles are possible.

Also the embodiments described below relate to a relative tilting of the beams or emitters, which however, unlike the previously discussed tilting, does not exist with respect to a plane perpendicular to the tilt axis of the mirror, but in a plane or family of planes containing the tilt axis. Accordingly, the direction of view from which this tilting is visible is not parallel to the tilting axis, but perpendicular to it. These two tilting possibilities can be realized as an alternative to each other, or even in combination with each other.

In a preferred embodiment, the beams are thus incident on the mirror tilted relative to each other so that they enclose a (second) angle with each other when viewed from a direction of view perpendicular to the tilt axis. As already mentioned, in the present case the subdivision into the solid angle segments results from the mirror movement and the sequential pulsing (of the first emitter). With the tilting by the second angle, each of the solid angle segments can now be further subdivided (into "solid angle segment parts"). If the correspondingly tilted emitters emit their pulses at the same time, these propagate in the same solid angle segment, but nevertheless tilted relative to each other into a separate respective "solid angle segment".

In terms of the application, the mirror movement can, for example, subdivide the horizontal opening angle (full angle) of the detection field, wherein the relative tilting of the emitters by the second angle or angles then again subdivides each of the solid angle segments in the vertical direction. Visually speaking, the different emitters can emit together or "fanned" relative to each other in a respective solid angle segment, namely fanned in a vertical direction in the aforementioned example.

On the operating side, the emitters assigned to a respective solid angle segment can emit at the same time, for example, in a first operating state, which results in a very long range, for example. If an object is detected in the solid angle segment in question, emission can be sequential in a second operating state in order to produce a resolution within the solid angle segment, in the example just in the vertical direction. In this case, even with an integrally measuring receiver unit (without location resolution), a resolution could be achieved in two directions.

With a preferred embodiment, the receiver unit is solid angle resolving in at least one plane. It can therefore assign pulses that arrive at the same time from different spatial directions to these spatial directions, in any case insofar as the spatial direction has a tilting component in the plane in which the receiver unit is solid angle resolving.

In a preferred embodiment, the solid angle resolving receiver unit is constructed from a line sensor with optics placed in front of it. Along a sensor line, the line sensor is spatially resolving, making radiation incident at different points on the sensor line distinguishable. With the optics placed in front, this spatial distribution is converted into a solid angle distribution, so that radiation incident from different spatial directions is directed to different areas of the sensor line (in the abstract, this change between solid angle distribution and spatial distribution corresponds to a Fourier transformation). Preferably, an arrangement of the optics is such that it forms an image of the sensor line at infinity. Imaging optics with a collection lens or a corresponding system of several individual lenses is generally preferred, for example. The sensor can generally also be solid angle resolving in several rows, i.e. constructed according to rows and columns corresponding to a surface sensor; preferably, however, it is solid angle resolving along just one line, also to avoid unnecessary cost.

A line sensor can also be set up with multiple photodiodes arranged next to each other. However, it is also possible to have an integrated component, for example approximately in the manner of a CCD array or a CMOS array. In general, an APD photodiode or a SPAD photodiode (Avalanche Photo Diode or Single Photon APD) can be used as a photodiode, whether integrally (not solid angle resolving) or as a multiple for solid angle resolution. However, a PIN diode or a photomultiplier can also be provided, for example. In general, it is suitable as a sensor, which in any case proportionally converts the radiation incident on it (especially IR radiation) into an electrical signal.

With a preferred embodiment, the receiver unit is arranged relative to the mirror and thus the solid angle segments in such a way that the at least one plane in which the receiver unit is solid angle-resolving is parallel to the tilt axis of the mirror. The receiver unit is thus solid angle selective within a respective solid angle segment, and thus can assign incident echo pulses from the fanned solid angle segment parts of the same solid angle segment to the different spatial directions. In relation to the orientation of the mounted distance measuring unit, the resolution by the grid (the mirror movement) can then result in the horizontal direction, for example, and the receiver unit is solid angle sensitive in the vertical direction or in vertical planes.

In a preferred embodiment, there are different operating modes, namely the first and the second emitter emit sequentially in a first operating mode, whereas they emit at the same time in a second operating mode. This has a different effect depending on whether the emitters are tilted with respect to a direction of view parallel to the tilt axis (by the first angle) or with respect to a direction of view perpendicular to the tilt axis (by the second angle). In the case of a tilt by the second angle, the simultaneous emission takes place in the same solid angle segment, whereas in the case of a tilt by the first angle sequentially emitted pulses reach the same solid angle segment.

In both cases, however, with the change between operating modes a change can advantageously be made between, for example, an "improved interference distance" mode, in which a good SNR is achieved by multiple pulsing of the same solid angle segment, and a "high spatial/time resolution" operating mode. If the pulses are not emitted in the same solid angle segment, for example, other of the solid angle segments may be supplied with pulses correspondingly more densely timed, which, for example, makes changes noticeable faster. The latter may be of particular interest with regard to semi-autonomous or fully autonomous vehicles.

For example, in the case of a very distant or unfavorable object (reflection properties, etc.) the echo pulse can become so small that no suitable signal can be obtained even by signal processing (merging several successive echo pulses). Then a change to a mode such that the pulses reach the respective solid angle segment at the same time can be advantageous, even if this is then at the expense of the resolution, for example (the solid angle segment parts can no longer be differentiated). In the case of a near/strongly reflective object, on the other hand, sequential operation can be advantageous insofar as it can be prevented from overdriving the receiver unit. A dynamic range, which is determined according to which bandwidth of the echo pulse outputs are to be expected, can be advantageously limited.

A preferred embodiment concerns the timing with a third emitter or even more emitters. In a third operating mode, only the first and the second emitters emit in at least one, i.e. the same, solid angle segment. In a fourth operating mode, the third emitter also emits in the same solid angle segment. Although a combination with the first/second operating mode may be preferred according to the above description, this is not mandatory, the reference to the third or fourth operating mode is primarily used for conceptual distinctness. This can then be continued with (an) additional emitter (s) included, so each emitter can emit in a separate solid angle segment with four emitters in one operating mode, for example, and in another operating mode each two emitters can emit in pairs in the same solid angle segment (which corresponds to a 2-2 division, wherein a 3-1 division would also be possible).

In a preferred embodiment, the distance measuring unit is set up in such a way that at least one of the emitters emits its pulses with a different power over time, preferably this applies to at least 30%, 50%, 70% or 90% of the emitters, particularly preferably to all emitters.

The power adjustment, for example a reduction in the case of a smaller object distance, can, for example, provide advantages in terms of the energy efficiency or the thermal budget of the emitter unit, or may also help to reduce a photobiological risk, especially with regard to a danger to the eyes. The terms "distance", "object distance" and "object-related distance" are used synonymously here and below. Vehicles moving semi-autonomously or fully autonomously can use a variety of distance measuring units, which are mounted at different positions of the vehicle and allow for an all-round view in combination. Also, technologically different distance measuring units can be used, in particular camera systems in the visible, ultraviolet and infrared spectral ranges, acoustic distance measuring units based on ultrasound or infrasound, radar-based distance measuring units as well as lidar-based distance measuring units. The different distance measuring units may be designed for measurement for different object distances, from the centimeter and meter ranges to distances of several hundred meters, or even beyond.

With a preferred embodiment, the power is adjusted depending on an object classification. For illustration, for example, pedestrians and cyclists can be assigned to a class and the pulses can be emitted with reduced power when the object is assigned to this class, for example to reduce a photobiological risk or to avoid glare effects, etc. Other object classes can be motorcycles, quads, traffic signs, cars, trucks, bridges, tunnels, traffic lights, overpasses, flying objects. The classification can be part of an object recognition, but the latter is generally not mandatory (for example, a truck does not necessarily have to be recognized as such, but can also be assigned a certain, usually greater power on the basis of a size criterion).

In the case of the motor vehicle, the data captured with the distance measuring unit can be supplemented, for example, by additional sensor data, for example camera recordings of the field of view, etc. This is possible with an object classification or recognition, but also for the above discussed extrapolation of distance functions by means of motion trajectories. On the other hand, classification or recognition may also be possible solely on the basis of the data captured by means of the distance measuring unit.

Object classification/recognition can be analogous to the methods known from two-dimensional image processing; in simple terms, the solid angle ranges define a grid and the respective assigned distance value can be considered as a grayscale. The measured distance image is then usually segmented, for example by means of defined threshold values or by an edge-based or region-based segmentation. The image can be searched for specific edge or surface formations or complete templates ("how might the object in question look following segmentation?"). The object or objects can then be organized into classes, especially by means of an object database, wherein this preferably results in an object recognition.

With a preferred embodiment, reduced power $P_1$ is emitted in the solid angle area or areas in which an object assigned as a pedestrian/cyclist is located. This refers to the comparison to a second power $P_2$, which occurs in the case of an assignment of the object to a second class. This applies at the same distance to the object (for example in the case of a very distant cyclist/pedestrian, the power may again be the same or greater than in the case of a motor vehicle at a short distance). In addition to motor vehicles, the second class may be assigned as other road users, for example motorway bridges or trees at the edge of the road, etc. If an object is classified as a tree, for example, an increased power $P_3$ can sometimes even be applied, because the disjointed surface structure of the leaves or needles suggests a worsened reflection or increased lateral dispersion.

With a preferred embodiment, power is reduced at a shorter distance. Assuming a first distance $d_1$ and a longer distance $d_2$, a first power $P_1$ is selected at the first distance to be less than a second power $P_2$, which is applied at the second distance. For example, an interval can be set around each of the distances $d_2$, and the power $P_1$ or $P_2$ is then applied depending on whether the measured or assigned distance value is in the first or second interval. There may then also be further intervals, for example n intervals, which when placed together define n levels, each with a different power $P_n$.

However, it is also possible to adjust continuously, so that the power P(d) can be stored as a continuous function of the distance. In particular, a polynomial function is considered, such as a second-degree polynomial, possibly with correction terms. Compared to the stepped adjustment, the continuous variant can allow for even higher accuracy, but on the other hand the stepped adjustment can be less complex and time-consuming, which can be advantageous in the automotive environment (short reaction times and simpler, robust components).

The invention also relates to a method for operating a distance measuring unit disclosed here, see also the remarks at the beginning. The distance to the object is measured based on the signal transition time, specifically based on the pulses or echo pulses emitted by the emitter(s) and then reflected at the object. At least two emitters both emit in at least some of the solid angle segments.

The invention also relates to the use of a distance measuring unit disclosed here in a motor vehicle, for example, a truck or motorcycle, preferably in a passenger car. Particularly preferred, the use is in a semi-autonomous or fully autonomous vehicle. In general, however, the use in an airborne vehicle or a waterborne vehicle, such as an aircraft, helicopter or ship, is also conceivable.

A vehicle may have a large number of distance measuring units according to the invention, wherein the detection field or the field of view (FOV) of each of the distance measuring units is preferably spatially disjointed relative to the other distance measuring unit or units. This allows a larger total solid angle range to be detected (forwards, sideways, behind, above the vehicle). If the distance measuring units have different IR laser wavelengths, the fields of view (FOV) cannot be disjointed, i.e. they at least partially overlap. The distance measuring units can be integrated into existing vehicle headlight systems, for example.

BRIEF DESCRIPTION OF THE FIGURES

The invention is explained below in more detail on the basis of an exemplary embodiment, wherein the individual features within the context of the secondary claims may also be material to the invention in other combinations of the invention and still not distinguished in detail between the different claim categories.

In particular, in the figures

FIG. 1a shows a motor vehicle with a distance measuring unit, as well as its detection field subdivided into solid angle segments in a bird's-eye view;

FIG. 1b shows the arrangement according to FIG. 1a in a side view in which the subdivision of a solid angle segment into solid angle segment parts is visible;

PREFERRED EMBODIMENT OF THE INVENTION

FIGS. 1a,b show a distance measuring unit 1, which is installed in a motor vehicle 2 and aligned in the direction of travel (forward). With the distance measuring unit 1, the distance to objects 3a,b, such as other vehicles or even pedestrians etc., can be measured if these objects 3a,b are located in the detection field 4 of the distance measuring unit 1. The detection field 4 has a horizontal opening angle α and a vertical opening angle β.

Figure 2:
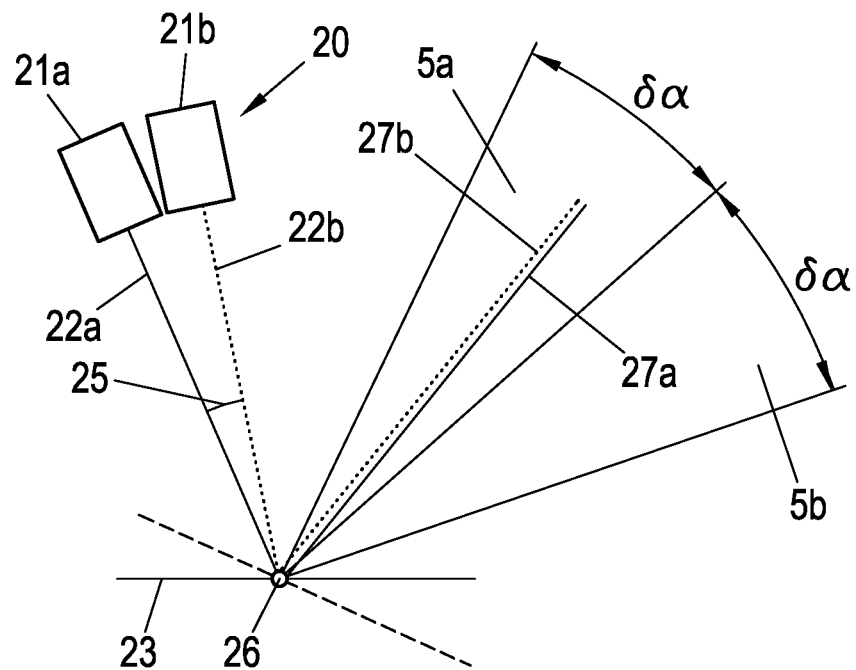
FIG. 2 shows in a schematic representation a first possibility for the implementation of the concept according to the invention.

As then explained in detail based on FIG. 2, the detection field 4 is subdivided horizontally into a number of solid angle segments 5a,b, which result from a pulsed emission via a tiltable (and moving) mirror. Each of the solid angle segments 5a,b corresponds to a mirror angular position, wherein a respective pulse 6 is guided into the respective solid angle segment 5a,b via the mirror. If there is an object located in the respective solid angle segment 5a,b, the pulse is reflected, so it comes back as an echo pulse and can be received with a receiver unit. Only after a pause duration, during which the echo pulse 7 of the previous pulse 6 is "listened" for, is the subsequent pulse 6 emitted in the next solid angle segment. The detection field 4 is thus scanned in a horizontal direction.

In the vertical direction there is a further subdivision, shown as an example for the first solid angle segment 5a. This is divided into the solid angle segment parts 5aa, ab, ac. As explained in detail below, the subdivision in the vertical direction does not result from the movement of the mirror, but from the arrangement of the emitters.

A basic idea in the present case is to supply the solid angle segments 5a,b not only with a single emitter, but with multiple emitters. FIG. 2 shows a first possibility for implementation, wherein as an example the emitter unit 20 is represented with a first emitter 21a and a second emitter 21b, but in practice still significantly more emitters can be provided. If a respective emitter 21a,b emits a pulse (the pulses themselves are not shown in FIG. 2 for clarity), this propagates along a respective beam 22a,b to a tiltable mirror 23. At its reflective surface, the pulses are then reflected into a respective solid angle segment 5a,b depending on the angular position.

In the present case, the operation is carried out in such a way that the first emitter 21a emits a pulse in a first angular position g (solid line) of the mirror 23, which reaches the first solid angle segment 5a. Then the second emitter 21b emits a pulse, which then, due to the changed angular position, passes into the first solid angle segment 5a coincident with the previous pulse of the first emitter 21a. Then in the second solid angle segment 5b the first emitter 21a again emits first (in a second angular position, not shown) and then the second emitter 21b emits. In a practical implementation, the mirror 23 will usually be operated in oscillation (see the introduction to the description), thus moving outwards and returning in a period. The emitters 21a,b can then also emit their sequentially delivered pulses in the same solid angle segment 51,b in consecutive periods, for example, i.e. the first emitter 21a during the outward movement and the second emitter 21b during the return movement of the mirror 23.

The first emitter 21a and the second emitter 21b are arranged relative to each other in such a way that the beams 22a,b enclose a first angle 25 with each other when viewed in the direction of view parallel to the tilt axis 26 according to FIG. 2. In the present case the first angle corresponds to half the opening angle δα of a respective solid angle segment 5a,b. The opening angle δα corresponds to the angle that lies between the first angular position (solid line) and the second angular position, which is not shown in FIG. 2 and in which the first emitter 21a emits in the second solid angle segment 5b. The reflected beams 27a,b are coincident after the mirror 23.

Figure 3:
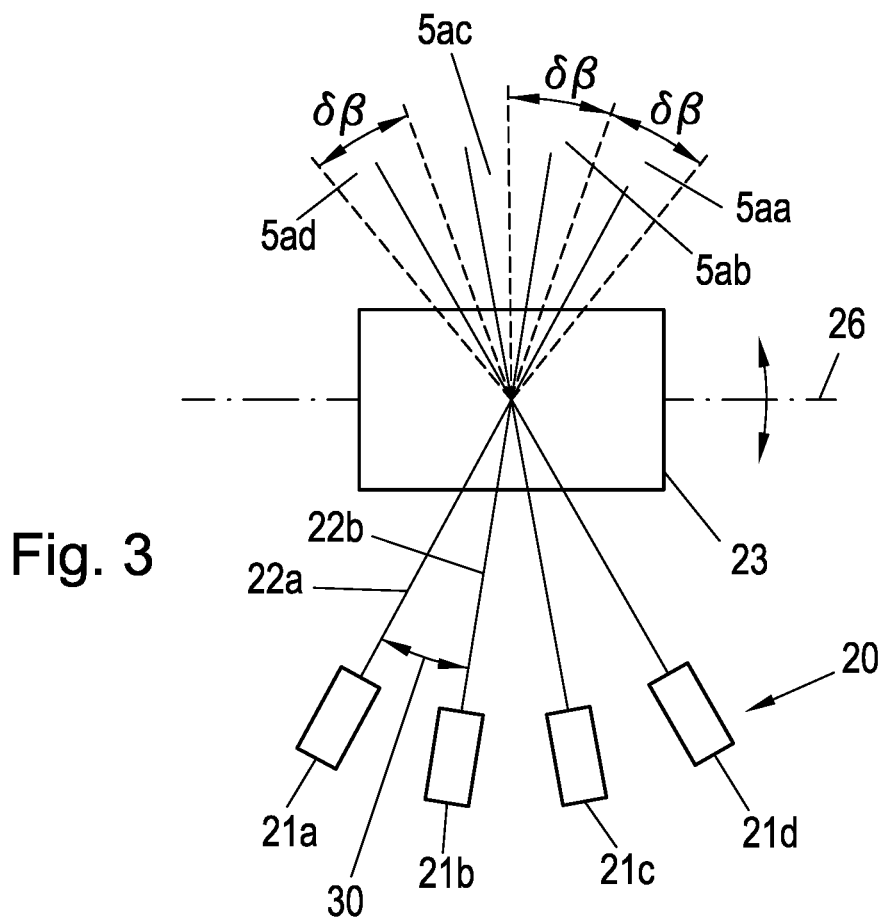
FIG. 3 shows in a schematic representation a second possibility for the implementation of the concept according to the invention.

FIG. 3 shows another possibility for the implementation of the concept according to the invention. The emitter unit 20 again has multiple emitters 21a-d. These are also arranged tilted relative to each other, but not relative to a direction of view parallel to the tilt axis 26 but seen from a direction of view perpendicular to the tilt axis 26. When viewed from this direction, in the present case the beams 22a,b are tilted relative to each other by a second angle 30, resulting in fanning within the respective solid angle segment 5a,b. In the present case, the mirror 23 is located in the first angular position in which the pulses pass into the first solid angle segment 5a. Since the beams 22a,b are tilted relative to each other, the pulses enter the first solid angle segment 5a in a separate solid angle segment part 5aa, 5ab.

The emitters 21a-d can now be operated, for example, in such a way that they emit their respective pulses simultaneously in the respective solid angle segment 5a,b. If then, for example, an integral, non-solid angle resolving measuring receiver unit is provided, the respective solid angle segment 5a,b is measured without further resolution (pixelation). If an object is detected in the respective solid angle segment, the emitters 21a-d can then also emit their pulses sequentially in the respective solid angle segment, whereby the individual solid angle segment parts 5aa can be resolved.

Figure 4:
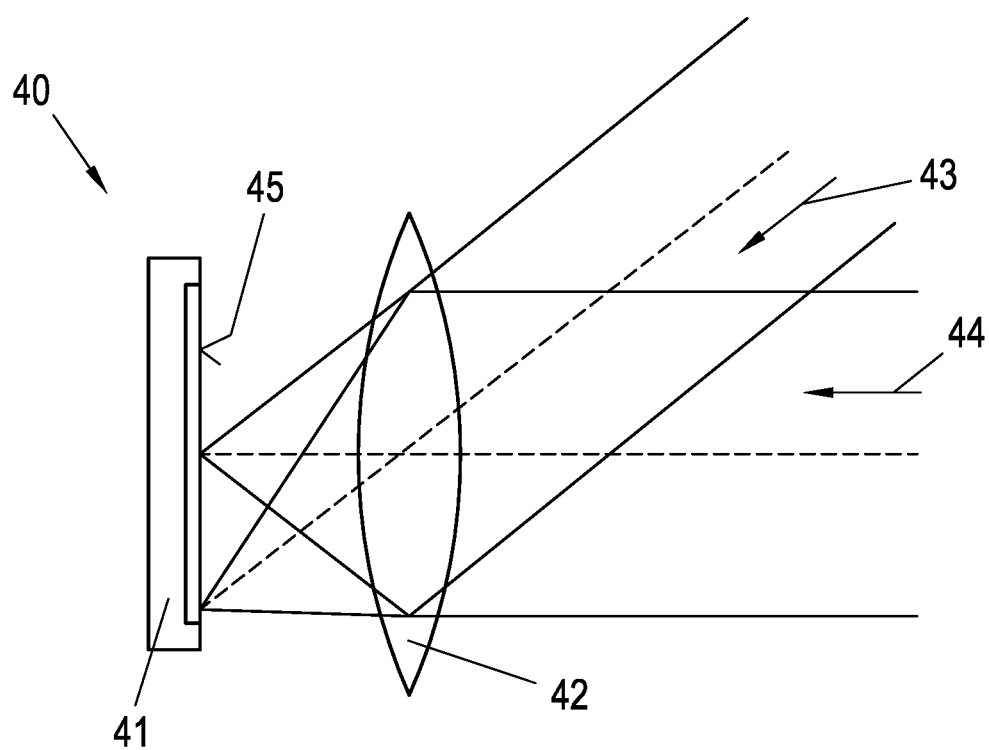
FIG. 4 shows a solid angle resolving receiver unit in a schematic representation.

On the other hand, as illustrated in FIG. 4, a solid angle resolving receiver unit 40 will be provided. This has a line sensor 41 with optics 42 placed in front. Due to the optics 42, 43, 44, echo pulses incident from different spatial directions are guided to different areas of a sensor line 45. Along this sensor line 45, the line sensor 41 is spatially resolving, it can be constructed, for example, of photodiodes placed next to each other. Radiation incident at different points of the sensor line 45 can thus be detected in a spatially resolved manner, which in turn allows assignment to the different spatial directions 43, 44.

In the present case, the line sensor 41 is spatially resolving in exactly one line, whereby the solid angle resolution exists in a plane, namely in the plane of the drawing in the variant according to FIG. 4. With such a receiver unit 40, together with the emitter arrangement 20 according to FIG. 3, resolution of the individual solid angle segment parts 5aa, 5ab can be achieved even with a simultaneous emission of the emitters 21a-d. For this purpose, the receiver unit 40 is aligned in such a way that the plane in which it is solid angle-resolving is parallel to the tilt axis 26, so that the echo pulses incident from the different solid angle segment parts 5aa, 5ab reach areas of the sensor line 45.

Furthermore, the emitter unit 20 according to FIG. 3 can also be used to the effect that the individual emitters 21a-d emit optionally (in groups) simultaneously or sequentially. If for example the emitters 21a-d emit one after the other with a respective time offset, the pulses enter a respective separate solid angle segment 5a,b. The horizontal opening angle α can then be measured with a particularly fine resolution. On the other hand, for example, the first emitter 21a and the second emitter 21b can also emit at the same time, then the third emitter 21c and the fourth emitter 21d can emit at the same time. The resolution is thus somewhat reduced, however, the power per solid angle segment 5a,b is increased, which can support or even enable detection, especially for objects at long distances.

As also mentioned in the description introduction, the arrangements according to FIGS. 2 and 3 can also be combined. The emitter unit 20 can thus have multiple emitters 21, which on the one hand are partly tilted when viewed in a direction of view parallel to the tilt axis 26 according to FIG. 2, and specifically in groups. The latter means that in FIG. 2 there are further emitters behind or in front of each of the two emitters 21a,b shown, whose beams are then each coincident with either the beam 22a or the beam 22b, and specifically in the view according to FIG. 2. On the other hand, in a view according to FIG. 3, i.e. within a respective group, the beams would be tilted relative to each other, cf. FIG. 3. If FIGS. 2 and 3 were to be combined with each other, the emitter unit 20 would have exactly eight emitters 21.

REFERENCE CHARACTER LIST

Distance measuring unit 1
Motor vehicle 2
Objects 3a,b
Detection field 4
Solid angle segments 5
   First solid angle segment 5a
   Second solid angle segment 5b
Pulse 6
Echo pulse 7
Emitter unit 20
Emitter 21
   First Emitter 21a
   Second Emitter 21b
   Third Emitter 21c
   Fourth Emitter 21d
Beams 22
   First beam 22a
   Second beam 22b
Mirror 23
First angle 25
Tilt axis 26
Reflected beams 27a,b
Second angle 30
Receiver unit 40
Line sensor 41
Optics 42
Spatial directions (different) 43,44
Sensor lines 45

The invention claimed is:

1. A distance measuring unit for signal transition time-based measurement of a distance to an object located in a detection field, the distance measuring unit comprising:
an emitter unit comprising multiple emitters, each configured to emit pulses in form of electromagnetic radiation;
a receiver unit configured to receive the electromagnetic radiation after a distance-dependent transition time; and
a tiltable mirror,
wherein a first emitter of the emitters is configured to emit multiple pulses sequentially in a first beam via the mirror including at a first time in a first solid angle segment in a first angular position of the mirror and at a second time in a second solid angle segment in a second angular position of the mirror,
wherein a second emitter of the emitters is also configured to emit a pulse in a second beam in at least one of the solid angle segments via the mirror,
wherein the first emitter and the second emitter are horizontally spaced apart with respect to each other and are configured to sequentially emit the pulses into the same solid angle segment, and
wherein the first emitter and the second emitter are arranged relative to each other such that the first and second beams enclose an angle with each other when viewed in a direction parallel to a tilt axis of the mirror.

2. The distance measuring unit as claimed in claim 1, wherein the first beam, along which the first emitter is configured to emit its pulse to the mirror, is tilted relative to the second beam, along which the second emitter is configured to emit its pulses to the mirror.

3. The distance measuring unit as claimed in claim 2, wherein the first beam and the second beam are tilted relative to each other in relation to the tilt axis of the mirror such that the beams enclose a first angle when viewed in the direction parallel to the tilt axis.

4. The distance measuring unit as claimed in claim 3, wherein, in the second angular position, the mirror is tilted by a tilting angle relative to the first, closest angular position, and wherein the first angle corresponds to half the tilt angle or is an integer multiple thereof.

5. The distance measuring unit as claimed in claim 3, wherein the first angle is at least 0.2°.

6. The distance measuring unit as claimed in claim 3, wherein an emission of a first pulse of the first emitter is timed with an emission of a second pulse of the second emitter so that the first pulse and the second pulse propagate downstream to the mirror on reflected beams which are coincident when viewed in the direction parallel to the tilt axis.

7. The distance measuring unit as claimed claim 2, wherein the first beam and the second beam enclose a second angle with each other relative to the tilt axis of the mirror when viewed in a direction perpendicular to the tilt axis.

8. The distance measuring unit as claimed in claim 1, wherein the receiver unit is solid angle resolving in at least one plane.

9. The distance measuring unit as claimed in claim 8, wherein the solid angle resolving receiver unit has optics and a line sensor with a sensor line for spatially resolved reception.

10. The distance measuring unit as claimed in claim 8, wherein the at least one plane in which the receiver unit is solid angle resolving is parallel to the tilt axis of the mirror.

11. The distance measuring unit as claimed in claim 1, wherein the first emitter and the second emitter are configured to emit their pulses sequentially relative to each other in a first operating mode and to emit their pulses simultaneously in a second operating mode.

12. The distance measuring unit as claimed in claim 1 wherein a further emitter of the emitters is also configured to emit a pulse via the mirror in the same solid angle segment, wherein, in a third operating mode, only the first emitter and the second emitter are configured to emit in the same solid angle segment over time, and wherein, in a fourth operating mode, the further emitter is configured to additionally emit in the same solid angle segment.

13. A method for operating the distance measuring unit as claimed in claim 1, the method comprising:
 measuring the distance to the object based on the signal transition time, for which the emitters emit their respective pulses,
 wherein the distance-dependent transition time is measured with the receiver unit.

14. The distance measuring unit as claimed in claim 9, wherein different areas of the sensor line are assigned by the optics to different spatial directions.

* * * * *